No. 750,888. Patented February 2, 1904.

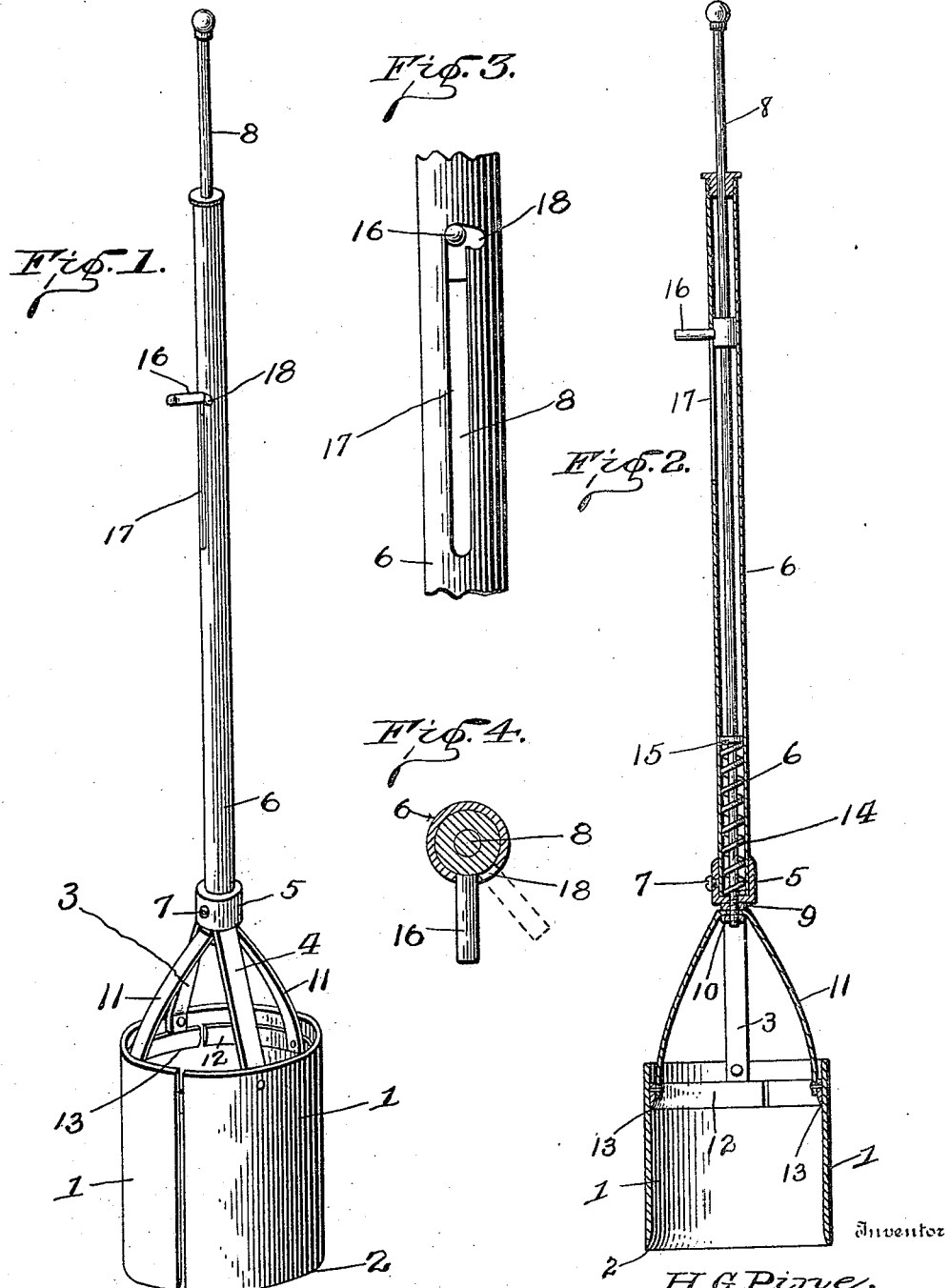

UNITED STATES PATENT OFFICE.

HARRY G. PINE, OF OSKALOOSA, IOWA.

POST-HOLE DIGGER.

SPECIFICATION forming part of Letters Patent No. 750,888, dated February 2, 1904.

Application filed April 30, 1903. Serial No. 155,048. (No model.)

*To all whom it may concern:*

Be it known that I, HARRY G. PINE, a citizen of the United States, residing at Oskaloosa, in the county of Mahaska and State of Iowa, have invented certain new and useful Improvements in Post-Hole Diggers; and I do hereby declare the following to be a full, clear, and exact description of the invention, such as will enable others skilled in the art to which it appertains to make and use the same.

My invention relates to digging instruments, and more especially to that class known as "post-hole diggers;" and my object is to provide a means whereby when the bowl of the digger has become compactly filled with earth it may be easily and quickly discharged of its contents; and a further object is to provide suitable means whereby the digger may be conveniently and efficiently operated to the best advantage.

Other objects and advantages will be hereinafter referred to and pointed out in the claims.

In the drawings, Figure 1 is a perspective view of my device complete. Fig. 2 is a central longitudinal sectional view thereof. Fig. 3 is a detail elevation of a portion of the handle, and Fig. 4 is a sectional view thereof.

Referring to the drawings, in which similar reference characters designate corresponding parts throughout, 1 indicates the bowl of the digger, said bowl being of the usual or well-known form, the extreme lower end being beveled to form a cutting edge 2. Secured to the upper end of the bowl 1 in any preferred way are arms 3 and 4, said arms being joined together at their upper ends by uniting with and being made a part of the socket 5.

The socket 5 is designed to receive the lower end of the tubular handle 6, said handle being secured in said socket in any manner, as by the binding-screw 7.

The tubular handle 6 is designed to form a housing for the push-rod 8 as well as serve as a handle to operate the bowl 1.

The push-rod 8 is provided upon its lower end with screw-threads and is adapted to receive the locking-nuts 9 and 10. Surrounding the rod 8 and secured between the nuts 9 and 10 is a bracket 11, attached to the lower depending ends of which is the ring-like member 12, said member having its lower end beveled to form a cutting edge, as at 13.

Surrounding the lower end of the rod 8 is a spring 14, one end of which finds a bearing against the floor of the socket 5 and the opposite end against a shoulder 15, rigidly secured to said rod 8, by which means the rod 8 is returned to its normal upward position.

To provide a convenient handhold and a means to operate the ring-like member 12, the rod 8 is extended beyond the upper end of the tubular handle 6. An auxiliary handhold 16 is secured to the push-rod 8 and extends at right angles to said rod through a slot 17, cut in the side of the tubular handle 6.

In operation the bowl 1 is driven into the earth until said bowl becomes filled, when the digger is removed, with its load, from the hole thus made and the contents of said bowl removed. This is usually accomplished by giving the bowl a slight jar by striking it upon some solid object; but in case the dirt should be damp and inclined to adhere to the wall of said bowl it becomes an arduous task to remove the dirt, and to this end I have provided the ring-like member 12, said member being adapted to rest against and encircle the inner wall of the bowl and is normally held near the upper end of said bowl through the action of the spring 14. When it is found that the earth is sticking within the bowl 1, the push-rod 8, carrying the ring-like member 12, is pushed downwardly through the medium of the handhold 16 and upper exposed end of said rod, thus bringing the cutting edge 13 of said member 12 down along the wall of the bowl, and thus severing the earth from said wall and at the same time exerts a downward pressure upon said earth, so that it is easily and quickly removed from the bowl. When the rod 8 and member 12 are in their uppermost position, said rod is slightly rotated, thus bringing the auxiliary handle 16 into the recess 18, formed at the upper end of the slot 17 and shown more clearly in Fig. 3. When the auxiliary handle 16 is thus placed in the recess 18, the push-rod 8 cannot move downwardly, thus providing means whereby the operator may easily handle and control the digger in driving it up and down to fill the bowl with earth. As soon as the bowl becomes filled the rod 8 is revolved until the auxiliary handhold 16 registers with the slot 17, when said rod and member 12 may be operated by pressing upon said handhold and upper end of said rod.

It will now be seen that I have not only provided means to remove the earth from the bowl of the digger, but by providing the auxiliary handle in connection with the rod 8 and means to lock said rod in its uppermost position said auxiliary handle and upper end of said rod may be utilized to great advantage in driving the digger into the earth, thus enabling me to use said parts to great advantage for two separate and distinct purposes.

While I have described the preferred combination and construction of parts deemed necessary in materializing my invention, I wish to comprehend all substantial equivalents and substitutes which may be considered as fairly falling within the scope of my invention.

Having thus fully described my invention, what I claim as new, and desire to secure by Letters Patent, is—

In a digger of the class specified, the combination with a bowl having arms 3 and 4 and a socket 5 at their upper ends, of a tubular handle; means to secure said handle in said socket; a rod 8 passing through said handle; a bracket removably secured to the lower end of said rod; a ring-like member having a beveled lower end secured to said bracket; shoulder 15 rigidly secured to the rod 8 near its lower end, a spring 14 surrounding said rod 8 between the shoulder 15 and the socket 5, said spring being adapted to return said rod and ring-like member to their normally upward position, an auxiliary handle 16 secured to the rod 8 near its upper end, said auxiliary handle extending through a slot 17 in the tubular handle 6, said slot being provided at its upper end with a downwardly-inclined recess 18 whereby when said auxiliary handle 16 is moved into said recess, said rod 8 and ring-like member 12 are locked against downward movement, substantially as and for the purpose set forth.

In testimony whereof I affix my signature in presence of two witnesses.

HARRY G. PINE.

Witnesses:
H. E. ANTRIM,
C. M. FIFIELD, Jr.